June 27, 1961  L. W. PACE  2,990,536
PNEUMATIC TIRE DEFLATION SIGNAL APPARATUS
Filed July 23, 1959  3 Sheets-Sheet 3
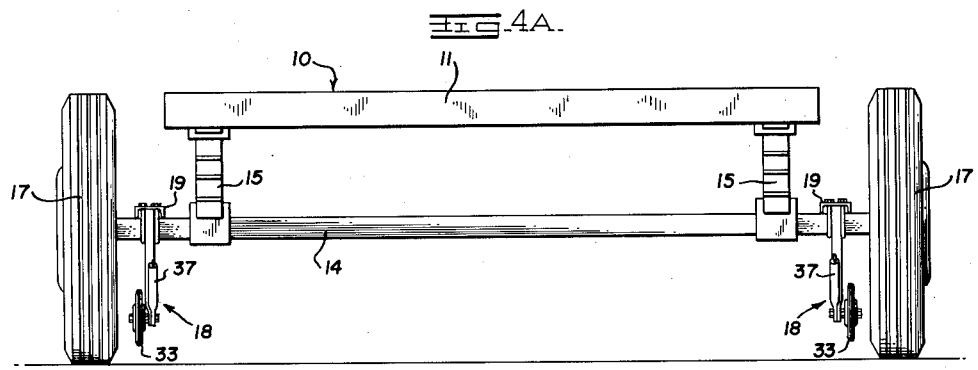
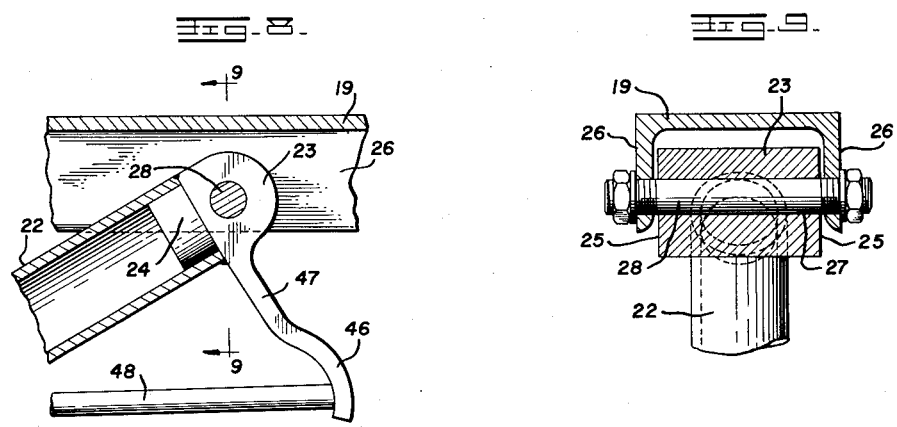
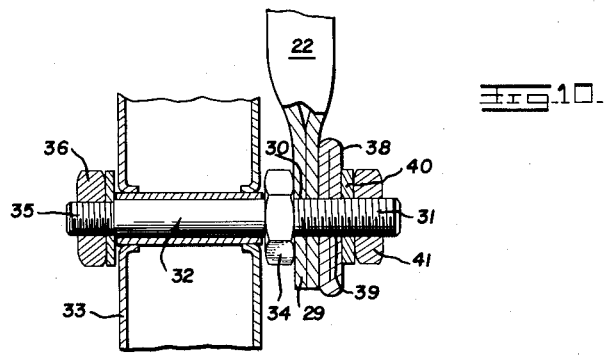
INVENTOR.
LLOYD W. PACE
BY
ATTORNEY United States Patent Office 2,990,536
Patented June 27, 1961

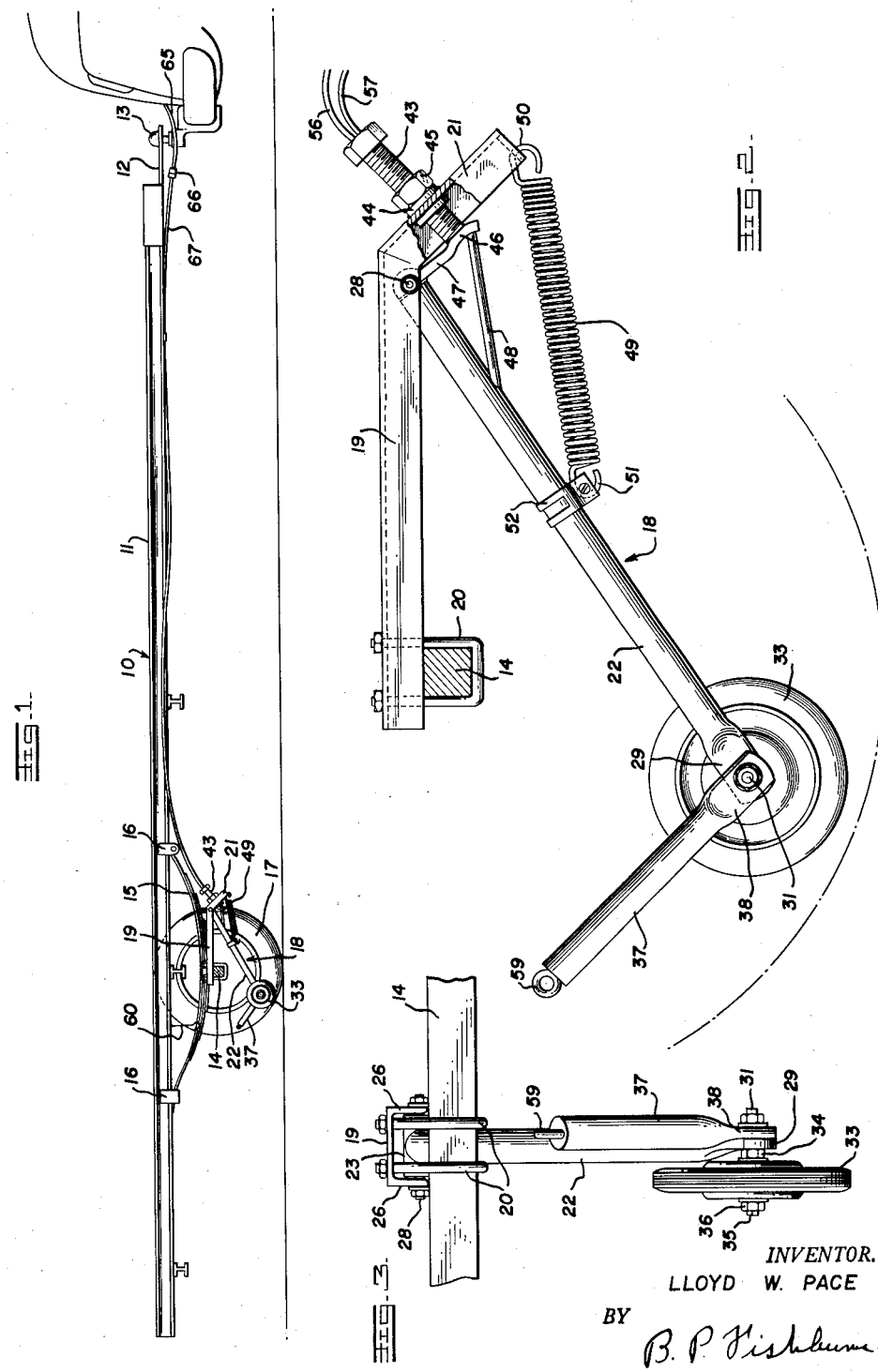

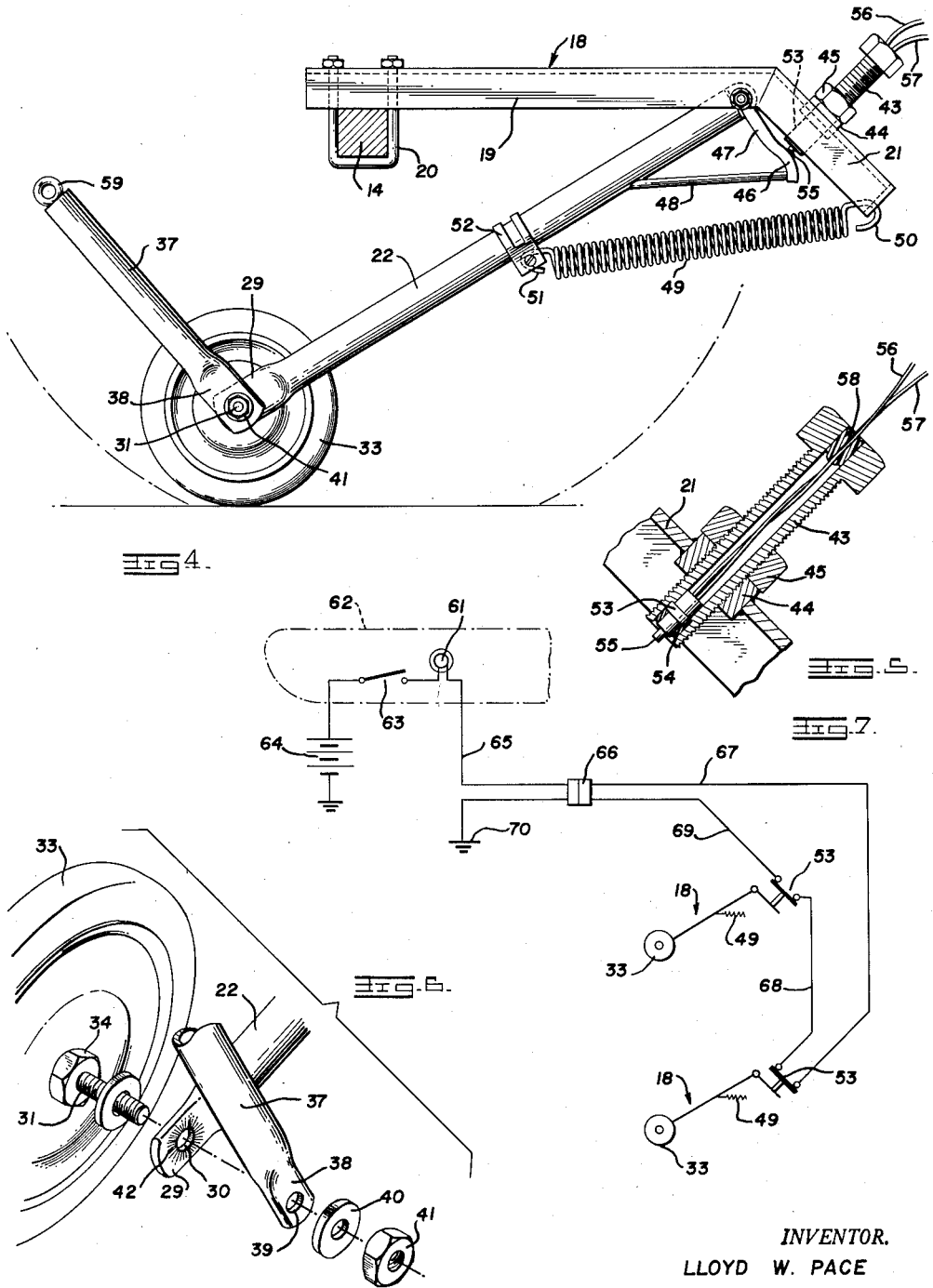

2,990,536
PNEUMATIC TIRE DEFLATION SIGNAL
APPARATUS
Lloyd W. Pace, Route 1, Simpsonville, S.C.
Filed July 23, 1959, Ser. No. 829,002
2 Claims. (Cl. 340—58)

The present invention relates to a pneumatic tire deflation signal apparatus.

An object of the invention is to provide a novel and simplified tire deflation signal apparatus, particularly adapted for installation in connection with automotive trailers, such as boat trailers or the like, but also useful for indicating tire deflation or failure in connection with any type of trailer or an ordinary automobile or truck.

A further object of the invention is to provide a tire deflation signal or indicator of the above-mentioned character which is simple to install and adjust, economical to manufacture, readily adaptable to a variety of types of trailers and automotive vehicles, and constitutes an important safety feature on the highway by informing the driver at all times about the condition of the pneumatic tires of the trailer or vehicle.

Other objects and advantages of the invention will be apparent during the course of the following description.

In the accompanying drawings forming a part of this application and in which like numerals are employed to designate like parts throughout the same, FIGURE 1 is a side elevation of the tire deflation signal according to the invention installed upon one type of automotive trailer.

FIGURE 2 is an enlarged fragmentary side elevation of the signal apparatus in FIGURE 1 in the normal inactive position, partly in section and partly broken away.

FIGURE 3 is a fragmentary end elevation of the apparatus shown in FIGURE 2.

FIGURE 4 is a further side elevation similar to FIGURE 2, but showing the signal apparatus in the active position as when one pneumatic tire of the trailer is partly deflated.

FIGURE 4a is a rear elevation of the apparatus shown in FIGURE 1.

FIGURE 5 is an enlarged fragmentary vertical section through an adjusting bolt and associated elements.

FIGURE 6 is an exploded perspective view of a wheel and associated elements employed in the apparatus.

FIGURE 7 is an electrical wiring diagram showing the circuit employed in the signal apparatus.

FIGURE 8 is a fragmentary vertical section through the pivot of the vertically swinging arm.

FIGURE 9 is a vertical section taken on line 9—9 of FIGURE 8.

FIGURE 10 is a fragmentary vertical section through the axle of the sensing wheel and associated elements.

In the drawings, wherein for the purpose of illustration is shown a preferred embodiment of the invention, the numeral 10 designates generally a conventional automotive trailer, such as a boat trailer, including a suitable horizontal frame 11 and hitch means 12 at the forward end of the frame 11 for securing the trailer to the rear bumper hitch 13 of an automobile or truck. The conventional trailer 10 has the usual underslung axle 14, connected with leaf springs 15, which are in turn secured to the trailer frame 11 at 16. Pneumatic tired wheels 17 are journaled upon the trailer axle in the usual manner.

The trailer tire deflation signal apparatus embodies a pair of units 18, FIGURE 4a, mounted upon the trailer axle 14 near and inwardly of the trailer wheel 17, and between such wheels and the springs 15, as best shown in FIGURE 4a.

Each unit 18 comprises an elongated horizontal mounting bar 19, preferably channel-shaped in cross section and having its rear end portion resting upon the trailer axle 14, and rigidly secured thereto by a pair of U-bolts 20, as shown. The rigid mounting bar 19 extends forwardly of the trailer axle 14 for a substantial distance, and is provided at its forward end with a preferably integral relatively short downturned extension 21, likewise channel-shaped in cross section. The inclined extension 21 is preferably arranged at about forty-five degrees below the horizontal, as indicated in the drawings.

An elongated vertically swingable arm or bar 22 is provided below the mounting bar 19 and is inclined downwardly and rearwardly with respect to the mounting bar. The arm 22 is preferably tubular, and is provided at its forward end with a separately formed head 23, having an integral cylindrical projection 24 engaging within the forward end of the tubular arm 22 and permanently rigidly secured therein by welding or the like. As shown in FIGURE 9, the head 23 extends upon opposite sides of the tubular arm 22 equidistantly and has its opposite ends 25 arranged in opposed closely spaced relation to the side webs 26 of channel-shaped mounting bar 19. The head 23 is apertured at 27 for the reception of a transverse bolt 28, which serves to pivotally secure the forward end of the arm 22 to the mounting bar 19, near the forward end of the latter, and just rearwardly of the downturned extension 21. The side webs 26 of channel-shaped mounting bar 19 are also apertured to receive the bolt 28, as shown in FIGURE 9. The laterally elongated head 23, FIGURE 9, serves to maintain the vertically swingable arm 22 properly centered between the side webs 26, and prevents appreciable sidewise or lateral movement of the vertically swingable arm.

The lower trailing end of the inclined vertically swingable arm 22 extends somewhat rearwardly of the axle 14, and is normally spaced a substantial distance below the axle, as shown in the drawings. The lower end portion of the tubular arm 22 is flattened at 29, and apertured at 30 for the reception of an inner screw-threaded extension 31 of a sensing wheel mounting axle 32. The axle 32 has freely journaled thereon for rotation a small rubber tired sensing wheel 33, which wheel is spaced outwardly slightly from the arm 22 and has its inner side separated from the flattened portion 29 of the arm by a collar 34, formed integral with the axle 32. The outer end of the axle 32 is screw-threaded at 35, for the reception of a nut 36, which serves to maintain the wheel 33 secured upon the axle 32.

An adjustable relatively short normally upwardly and rearwardly inclined back-up facilitating arm or runner 37 is provided adjacent to the arm 22, and the runner 37 is preferably tubular and has a lower flattened end portion 38 integral therewith, arranged in opposed contacting relation with the flattened portion 29 and apertured at 39 to receive the screw-threaded extension 31 of sensing wheel axle 32. A flat washer 40 and nut 41 upon the screw-threaded extension 31 serve to clampingly secure the flattened end portions 29 and 38 together and against the fixed collar 34, FIGURE 10.

As previously stated, the back-up facilitating runner 37 is angularly adjustable upon the axis of the sensing wheel axle 32, and to facilitate accurate adjustment of the same as well as positive locking of the runner in selected adjusted positions, the opposed contacting faces of the flattened portions 29 and 38 are preferably serrated radially of the apertures 30 and 39, as shown at 42, in FIGURE 6. By this means, the runner 37 may be readily adjusted to the desired angle of inclination and securely locked in the selected adjusted position.

A relatively long tubular screw-threaded adjusting bolt 43 extends at right angles to the inclined extension 21 of mounting bar 19, and has screw-threaded engagement within an internally screw-threaded bushing 44, securely welded within an opening in the extension 21, FIGURE 5. A lock nut 45 is provided upon the adjusting bolt 43, for securely locking the same in the selected adjusted position. The tubular bolt 43 is inclined at about forty-five degrees to the horizontal, and the lower or inner end of the adjusting bolt 43 engages a slightly rounded cam portion 46 of a laterally extending rigid plate 47, preferably formed integral with the enlarged head 23 on the upper end of arm 22. The plate 47 extends at right angles to the arm 22 and lies close to the bottom of the inclined extension 21, as shown in the drawings. The plate 47 is preferably further interconnected with the arm 22 by a suitable diagonal brace 48, welded thereto and also welded to the arm 22.

A diagonally extending retractile coil spring 49 has one end connected at 50 to the lower end of the extension 21 and its opposite end connected at 51 to a clamp 52, which is adjustably clamped about the arm 22 as shown in the drawings. The spring 49 serves to resiliently urge the vertically swingable arm 22 downwardly, and the spring maintains the cam part 46 in positive contact with the lower end of adjusting bolt 43 at all times. It may now be seen that the angle of inclination of the arm 22 and the elevation of the sensing wheel 33 above the road and above the bottom of the trailer wheel 17 may be readily adjusted through the medium of the bolt 43 and cam part 46. The tension of spring 49 is also readily adjustable by changing the position of the clamp 52 upon the arm 22, as should be obvious.

The tubular adjusting bolt 43 also serves as a weatherproof housing for an electrical switch 53 of a conventional type, which switch is rigidly secured within the lower portion of the bore of tubular bolt 43 and permanently sealed therein by a water-proof plastic resin 54 or the like. A switch actuating element or button 55 normally projects axially beyond the lower end of the bolt 43, FIGURE 5, and the cam part 46 of plate 47 normally engages the element 55 and forces the same inwardly to maintain the switch 53 normally closed, FIGURE 2.

Wires 56 and 57 leading from the switch 53 of each unit 18 of the apparatus extend through the bore of the tubular bolt 43 of each unit 18 and are sealed within the top end of the bolt 43 by a water-proof plastic resin mass 58, or the like. The seals 54 and 58 keep moisture out of the tubular bolt 43 and away from the switch 53, and the plastic seal 54 also serves to secure the switch within the bore of the bolt. The inclination of the bolt 43 causes it to naturally drain any moisture which might tend to accumulate therein.

The runner 37 of each unit 18 is provided at its top end with an eye 59 rigid therewith, engageable with a hook 60, FIGURE 1, dependingly secured to the trailer frame 11, rearwardly of the axle 14. When it is desired to elevate the units 18 a substantial distance above the ground, as when backing the boat trailer into the water or the like, the units 18 may be lifted and the hook 60 engage with the eyes 59, and by this arrangement, the units 18 may be held well above the ground for the purpose previously described.

With reference to diagrammatic FIGURE 7, a signal light 61 is mounted upon the instrument panel 62 of the automobile or truck which pulls the trailer 10. The ignition switch 63 of the automobile is connected in series with the automobile storage battery 64 and the signal light 61, as shown. One terminal of the light 61 is connected with a wire 65 which leads to a terminal of a two-part separable connector 66, which may be arranged in the trunk of the automobile or exteriorly thereof as shown in FIGURE 1. Another wire 67 leads from one terminal of the connector 66 and is connected to a terminal of one of the switches 53, as shown. The other terminal of this switch 53 is connected in series with a terminal of the second switch 53 by a wire 68, and the second terminal of the last-named switch 53 is connected with a wire 69, which leads to the other terminal of connector 66 and beyond this connector to ground at 70. In connection with FIGURE 7, it should be understood that the individual wires 56 and 57 of each switch 53 are embodied in the cables or wires 67, 68 and 69 shown in diagrammatic FIGURE 7. The arrangement is such that the signal light bulb 61 is electrically connected in series with the two switches 53, and these switches are maintained normally closed by the cam elements 46 of the companion identical units 18, as long as the latter are above and out of contact with the road as indicated in FIGURE 2. This condition will prevail as long as the trailer tires 17 are adequately inflated, and the signal light 61 will be on when the ignition switch 63 is closed, to notify the driver that the condition of the trailer tires is satisfactory.

When either of the trailer tires loses air and becomes partially deflated, FIGURE 4, the entire adjacent unit 18 will be lowered with the axle 14, and the sensing wheel 33 which normally rides about an inch or so above the road will contact the road, and this will cause the arm 22 to swing upwardly or clockwise sufficiently for the cam part 46 to effect the opening of the particular switch 53, as shown in FIGURE 4. When either switch 53 is thus opened due to a loss of air in either trailer tire 17, the circuit through the signal light 61 is opened and the signal light is extinguished or begins to flicker, and the driver is thereby informed of the partial deflation of the particular trailer tire and can stop the vehicle before any serious trouble occurs. Of course, if both trailer tires should become deflated simultaneously, which is very unlikely, both switches 53 would be opened and the signal light 61 would be extinguished in the same manner.

It is also contemplated within the scope of the invention to utilize a single normally closed switch in conjunction with two sensing units 18 mounted upon a common transverse rock shaft, and it is also contemplated to use only a single sensing unit 18 mounted near the center of the axle 14 with supporting arms for sensing wheels extending near the two wheels 17 of the trailer, and such single unit would embody a single normally closed switch 53 only.

When it is desired to back up the trailer 10, the inclined runners 37 of the units 18 will engage any large obstructions which might be on the roadway or ground and enable the wheel or wheels 33 to successfully ride over such obstructions.

The tire deflation signal apparatus according to the invention is extremely simplified in construction, foolproof in operation, very easy to install upon a variety of trailers and vehicles and very economical to manufacture and maintain. The parts are readily adjustable as described, and the apparatus constitutes an important safety feature which may be incorporated in boat trailers and the like when they are manufactured or readily added thereto subsequent to manufacturing.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A pneumatic tire deflation signal apparatus for trailers and the like, said apparatus comprising in combination with a trailer axle having a pneumatic tired wheel mounted thereon, a substantially horizontal mounting bar secured to said axle and extending for a substantial distance beyond one side thereof, a downturned extension carried by said mounting bar, an inclined vertically swingable arm having its upper end pivoted to said mounting bar near said downturned extension, a sensing wheel journaled upon the lower end of said arm, a switch actuating and arm adjusting lateral extension secured to said arm adjacent the upper end thereof and extending near and generally parallel to said downturned extension, a tubular adjusting bolt extending generally at right angles to said downturned extension and having screw-threaded engagement with the downturned extension and having an end engaging said adjusting lateral extension and operable with said adjusting lateral extension to adjust the angle of inclination of said arm, a spring interconnecting said arm and downturned extension and resiliently urging said arm downwardly and maintaining said adjusting lateral extension in contact with said end of the tubular adjusting bolt, a switch housed within the tubular adjusting bolt and having an operating element engaging the adjusting lateral extension, said switch held normally closed by said adjusting lateral extension, a signal light upon the vehicle which tows the trailer in view of the driver and lit while said switch is maintained closed and connected in circuit with said switch and becoming extinguished when the trailer tire is partially deflated to notify the driver, deflation of said trailer tire lowering the sensing wheel into contact with the roadway and elevating said arm and thereby moving said adjusting lateral extension away from contact with said end of the adjusting bolt and opening said switch.

2. A pneumatic tire deflation signal apparatus for vehicles comprising a relatively stationary support member rigidly secured to the vehicle frame structure, an arm dependingly pivotally secured to said support member and adapted to swing vertically, a sensing wheel journaled upon the lower end of the arm and engaging the ground to cause upward swinging movement of the arm when a tire of the vehicle is partly deflated, spring means interconnecting the support member and arm to maintain the arm biased downwardly toward the ground, an axially adjustable tubular housing member secured to the support member and spaced laterally of said arm near one side thereof and generally parallel thereto, a switch secured within the tubular housing member and having a reciprocatory actuator element projecting below the lower end of the housing member, a cam element connected with the pivot of said arm and swingable with the arm and extending beyond one side of the arm in opposed relation to the housing member and said switch actuator element, said cam element depressing the switch actuator element to maintain the switch normally closed while said arm is biased downwardly by the spring means, said cam element swinging away from the switch actuator element to thereby open the switch when said arm swings upwardly upon contact of the sensing wheel with the ground, and signal light means upon the vehicle in view of the driver and electrically connected in circuit with the switch and illuminated while the switch is closed and being extinguished when the switch is open due to partial tire deflation.

References Cited in the file of this patent

UNITED STATES PATENTS

| | | |
|---|---|---|
| 2,091,101 | Moss | Aug. 24, 1937 |
| 2,442,956 | Meroney | June 8, 1948 |

FOREIGN PATENTS

| | | |
|---|---|---|
| 280,483 | Germany | Nov. 14, 1914 |
| 1,025,701 | France | Apr. 20, 1953 |